United States Patent
Kim et al.

(10) Patent No.: US 9,189,072 B2
(45) Date of Patent: Nov. 17, 2015

(54) DISPLAY DEVICE AND CONTROL METHOD THEREOF

(75) Inventors: Taehyeong Kim, Seoul (KR); Kyungyoung Lim, Seoul (KR); Sangki Kim, Seoul (KR); Yongwon Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 105 days.

(21) Appl. No.: 13/981,441

(22) PCT Filed: Feb. 8, 2011

(86) PCT No.: PCT/KR2011/000816
§ 371 (c)(1),
(2), (4) Date: Jul. 24, 2013

(87) PCT Pub. No.: WO2012/108552
PCT Pub. Date: Aug. 16, 2012

(65) Prior Publication Data
US 2013/0307768 A1 Nov. 21, 2013

(51) Int. Cl.
G06F 3/01 (2006.01)
G06K 9/00 (2006.01)
G06K 9/46 (2006.01)
G06F 3/0481 (2013.01)

(52) U.S. Cl.
CPC .............. *G06F 3/017* (2013.01); *G06F 3/011* (2013.01); *G06F 3/0481* (2013.01); *G06K 9/00355* (2013.01); *G06K 9/00375* (2013.01); *G06K 9/00389* (2013.01); *G06K 9/46* (2013.01)

(58) Field of Classification Search
None
See application file for complete search history.

(56) References Cited

U.S. PATENT DOCUMENTS

| | | | | |
|---|---|---|---|---|
| 5,990,893 A | * | 11/1999 | Numazaki | 715/863 |
| 6,043,805 A | * | 3/2000 | Hsieh | 345/158 |
| 6,147,678 A | * | 11/2000 | Kumar et al. | 345/158 |
| 6,191,773 B1 | * | 2/2001 | Maruno et al. | 345/158 |
| 6,256,400 B1 | * | 7/2001 | Takata et al. | 382/103 |
| 6,346,933 B1 | | 2/2002 | Lin | |
| 6,408,257 B1 | | 6/2002 | Harrington et al. | |
| 6,950,534 B2 | * | 9/2005 | Cohen et al. | 382/103 |
| 6,993,157 B1 | * | 1/2006 | Oue et al. | 382/103 |
| 7,702,130 B2 | * | 4/2010 | Im et al. | 382/103 |
| 8,643,598 B2 | * | 2/2014 | Tsurumi et al. | 345/158 |
| 8,666,115 B2 | * | 3/2014 | Perski et al. | 382/103 |
| 2002/0041327 A1 | * | 4/2002 | Hildreth et al. | 348/42 |
| 2006/0209021 A1 | | 9/2006 | Yoo et al. | |
| 2007/0070037 A1 | * | 3/2007 | Yoon | 345/156 |
| 2008/0085048 A1 | * | 4/2008 | Venetsky et al. | 382/153 |
| 2011/0013805 A1 | * | 1/2011 | Okada et al. | 382/103 |
| 2011/0268365 A1 | * | 11/2011 | Lou et al. | 382/224 |
| 2011/0280441 A1 | * | 11/2011 | Chen et al. | 382/103 |
| 2012/0087543 A1 | * | 4/2012 | Choi et al. | 382/103 |
| 2012/0200494 A1 | * | 8/2012 | Perski et al. | 345/156 |

\* cited by examiner

*Primary Examiner* — Dismery Mercedes
(74) *Attorney, Agent, or Firm* — Birch, Stewart, Kolasch & Birch, LLP (57) ABSTRACT

Disclosed are a display device and a control method thereof. The display device and the control method include a camera acquiring an image including a gesture made by a user, and a controller extracting an object making the gesture from the image acquired by the camera, and setting a specific spot in the extracted object to be a reference point of a movement of the object, the controller fixing the reference point to a set location regardless of a change in a shape of the extracted object. Accordingly, a reference point is set at a specific spot of an object having made a gesture corresponding to the acquisition of control thereon, thereby allowing for the accurate and effective recognition of a gesture made by a user.

14 Claims, 7 Drawing Sheets

DISPLAY DEVICE AND CONTROL METHOD THEREOF

TECHNICAL FIELD

The present invention relates to a display device and a control method thereof, and more particularly, to a display device, which is configured to permit stable manipulation using gestures by fixing the location of a reference point even when the shape of an object is changed to make gestures, and a control method thereof.

BACKGROUND ART

The diversification of the functions of terminals, such as personal computers, laptop computers, cellular phones or the like, has led to the implementation thereof into multimedia player type terminals equipped with a variety of functions of, for example, capturing motion images, shooting still photos, reproducing music or video files, providing games, receiving broadcasting signals or the like.

Terminals, as multimedia devices, may also be called display devices in that they are configured to display a variety of image information in general.

Such display devices may be classified as portable and stationary types according to the mobility thereof. For example, portable display devices may include laptop computers, cellular phones or the like, and the stationary display devices may include televisions, monitors for desktop computers, or the like.

DISCLOSURE OF INVENTION

Technical Problem

It is, therefore, an object of the present invention to provide a display device which is configured to permit stable manipulation using gestures by fixing the location of a reference point even when the shape of an object is changed to make gestures, and a control method thereof.

Solution to Problem

According to an aspect of the present invention, there is provided a display device including: a camera acquiring an image including a gesture made by a user; and a controller extracting an object associated with the gesture from the image acquired by the camera, and setting a specific spot in the extracted object to be a reference point of a movement of the object, the controller fixing the reference point to a set location regardless of a change in a shape of the extracted object.

The controller may set the reference point on the basis of a reference region in which the extracted object is not substantially changed in shape.

The controller may set the reference point at a central portion of the reference region.

The extracted object may be a hand of the user, and the reference region may be a palm of the hand, wherein the controller may set the reference point in the palm.

The controller may display a cursor on a location on a display unit matched to the reference point, and a function corresponding to the gesture made by a finger of the hand is executed on the matched location.

The controller may set the reference region according to a kind of the extracted object.

When the controller acquires the gesture corresponding to a selection of a preset function of the display device, the controller may not reflect a motion value of the reference point to a movement of a cursor on a display unit matched to the reference point.

According to another aspect of the present invention, there is provided a display device including: a display unit; a camera acquiring an image of an object; and a controller extracting the object from the image acquired by the camera and displaying an indicator corresponding to a movement of the object on the display unit, the controller changing a location of the indicator displayed on the display unit, corresponding to one spot in a reference region in which the extracted object is not substantially changed in shape.

The controller may set a central point of the reference region to be a reference point matched to the indicator.

The object may be a hand, and the reference region may be a palm of the hand, wherein the controller may set the one spot in the palm.

The controller may execute a function of the display device corresponding to a gesture of the object positioned outside the reference region.

According to still another aspect of the present invention, there is provided a method of controlling a display device, the method including: acquiring an image of a user; extracting an object making a gesture from the acquired image; and setting a reference point, fixed regardless of a change in a shape of the object according to the gesture, at a specific spot in the extracted object.

In the setting of the reference point, the reference point may be set on the basis of a reference region in which the extracted object is not substantially changed in shape.

In the setting of the reference point, the reference point may be set at a central point of the reference region.

The extracted object may be a hand of the user, and the reference region may be a palm of the hand, wherein the reference point may be set in the palm.

The method may further include displaying a cursor a location of which is changed corresponding to the reference point.

The setting of the reference point may include: determining a kind of object; setting a reference region according to the determined kind of object; and setting the reference point at a central point of the reference region.

Advantageous Effects of Invention

According to exemplary embodiments of the invention, there are provided the display device capable of permitting the stable manipulation thereof using gestures by fixing the location of a reference point even when the shape of an object is changed to make gestures, and the control method thereof.

BRIEF DESCRIPTION OF DRAWINGS

FIGS. 7A through 10B are views illustrating the case in which a reference point varies according to a gesture.

FIGS. 11A through 13B are views illustrating the operation of a display device according to an embodiment of the present invention.

MODE FOR THE INVENTION

Hereinafter, exemplary embodiments of the present invention will be described in more detail with reference to the accompanying drawings, wherein the same reference numerals are used to denote the same or substantially the same elements throughout the drawings and the specification.

The terms "module" and "unit" may be used herein to have the same meaning for ease of description.

A display device according to the embodiments of the present invention may include a cellular phone, a smart phone, a laptop computer, a terminal for digital broadcasting, a personal digital assistant ("PDA", a portable multimedia player ("PMP"), a GPS navigation device, etc.

Figure 1:
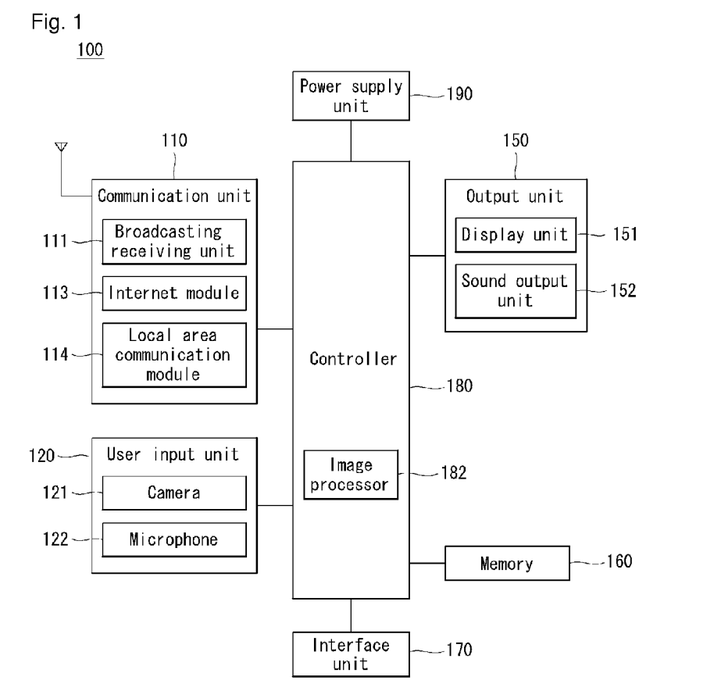
FIG. 1 is a block diagram illustrating a display device according to an embodiment of the present invention.

FIG. 1 is a block diagram illustrating a display device according to an embodiment of the present invention.

A display device 100 may include a communication unit 110, a user input unit 120, an output unit 150, a memory 160, an interface unit 170, a controller 180, and a power supply unit 190. However, the display device 100 is not limited thereto, and may be configured to include more components or to include fewer components.

The communication unit 110 may include one or more modules that allows for communication between the display device 100 and a communication system or between the display device 100 and other devices. For example, the communication unit 110 may include a broadcast receiving unit 111, an internet module unit 113, a near-field communication module unit 114, etc.

The broadcast receiving unit 111 receives a broadcast signal and/or broadcast-related information from an external broadcast managing server through a broadcast channel.

The broadcast channel may include a satellite channel or a terrestrial channel. The broadcast managing server may include a server that generates and transmit a broadcast signal and/or broadcast-related information, or a server that receives a pre-generated broadcast signal and/or broadcast-related information and transmits the pre-generated broadcast signal and/or broadcast-related information to a terminal. The broadcast signal may include a TV broadcast signal, a radio broadcast signal, a data broadcast signal, as well as a mixed signal of a data broadcast signal and a TV broadcast signal or a radio broadcast signal.

The broadcast-related information may include information on a broadcast channel, a broadcast program, or a broadcast service provider. The broadcast-related information may be provided over a communication network.

The broadcast-related information may include various forms, for example, such as EPGs ("Electronic Service Guides") for DMB ("Digital Multimedia Broadcasting") or ESGs ("Electronic Service Guides") for DVB-H ("Digital Video Broadcast-Handheld").

The broadcast receiving unit 111 may receive a broadcast signal using various broadcast systems.

The broadcast signal and/or broadcast-related information received through the broadcast receiving unit 111 may be stored in the memory 160.

The internet module unit 113 is a module for internet access. The internet module unit 113 may be provided inside or outside the display device 100.

The near-field communication module unit 114 is a module for near-field communication. For example, bluetooth, RFID ("Radio Frequency Identification"), IrDA ("Infrared Data Association"), UWB ("Ultra Wideband"), or ZigBee may be employed for near-field communication.

The user input unit 120 is provided for input of an audio signal or a video signal. The user input unit 120 may include a camera 121 and a microphone 122. The camera 121 processes an image frame, such as a still image or a motion image, that is acquired by an image sensor in a video call mode or an image capturing mode. The processed image frame may be displayed on a display unit 151.

The image frame processed in the camera 121 may be stored in the memory 160 or may be externally transmitted through the communication unit 110. Depending on the configuration of a terminal, two or more cameras 121 may be provided. The camera 121 may be two-dimensional or three-dimensional imaging camera 121 alone or a combination thereof.

The microphone 122 receives an external sound signal in a call mode, a recoding mode, or a voice recognition mode and converts the sound signal into electrical voice data. The microphone 122 may include various noise-cancelling algorithms for removing noise generated when receiving the external sound signal.

The output unit 150 may include the display unit 151 and a sound output unit 152.

The display unit 151 outputs information processed by the display device 100. For example, the display unit 151 may display a UI ("User Interface") or GUI ("Graphic User Interface") associated with the display device 100. The display unit 151 may be at least one of a LCD ("Liquid Crystal Display"), a TFT-LCD ("Thin Film Transistor-Liquid Crystal Display"), an OLED ("Organic Light-Emitting Diode"), a flexible display, and a three-dimensional display. Some of the above displays may be configured as a transparent or light-transmission type display through which the outside may be viewed. This may be called "transparent display". An example of the transparent display includes a transparent LCD. A rear portion of the display unit 151 may also have a light-transmission structure. Such a structure allows a user to view an object located at an opposite side of the terminal body through a portion which is occupied by the display unit 151.

According to a type of implementing the display device 100, two or more display units 151 may be provided. For example, a plurality of display units 151 may be integrally formed on a surface of the display device 100 or may be arranged on the surface of the display device 100 to be spaced apart from each other. And, the plurality of display units 151 may be arranged on different surfaces of the display device 100.

In a case where the display unit 151 and a sensor sensing a touch operation (hereinafter, referred to as "touch sensor" are mutually layered, the display unit 151 may function as an input device, as well as the output device. The touch sensor may be configured as, for example, a touch film, a touch sheet, and a touch pad.

The touch sensor may be configured to convert a variation in capacitance that occurs at a specific area of the display unit 151 or a pressure exerted to a specific area of the display unit 151 into an electrical input signal. The touch sensor may be configured to sense a pressure when touched as well as the position and area of a touch.

When the touch sensor is touched, a signal corresponding to the touch is transmitted to a touch controller. The touch controller processes the signal to generate corresponding data, and transmits the data to the controller 180. Accordingly, the controller 180 may determine what area of the display unit 151 has been touched.

The sound output unit 152 may output audio data received from the communication unit 110 or stored in the memory 160. The sound output unit 152 may output a sound signal associated with a function performed in the display device 100 (for example, a call signal receiving sound, a message receiving sound, etc.). The sound output unit 152 may include a receiver, a speaker, a buzzer, or the like.

The memory 160 may store a program for operating the controller 180 or preliminarily store input/output data (for example, a phone book, messages, still images, motion images, etc.). The memory 160 may also store data associated with vibrations and sounds of various patterns outputted when the touch screen is touched.

The memory 160 may include at least one storage of a flash memory type memory, a hard disk type memory, a multimedia card micro type memory, a card type memory (for example, SD or XD memory), a RAM ("Random Access Memory"), an SRAM ("Static Random Access Memory"), a ROM ("Read-Only Memory"), an EEPROM ("Electrically Erasable Programmable Read-Only Memory"), a PROM ("Programmable Read-Only Memory"), a magnetic memory, a magnetic disk, and an optical disk. The display device 100 may operate in association with a web storage that performs a storage function of the memory 160 over the Internet.

The interface unit 170 serves as a passage to all the external devices connected to the display device 100. The interface unit 170 receives data or power from an external device and transmits the data or power to each of the components in the display device 100, or allows data from the inside of the display device 100 to the external device. For example, the interface unit 170 may include a wired/wires headset port, an external recharger port, a wired/wireless data port, a memory card port, a port for connecting a device having an identifiable module, an audio I/O ("Input/Output") port, a video I/O port, and an earphone port.

The controller 180 controls the overall operation of the display device. For example, the controller 180 performs control or process associated with voice call, data communication, and video call. The controller 180 may include an image processing unit 182 for image processing. The image processing unit 182 will be described below in greater detail.

The power supply unit 190 receives external or internal power under the control of the controller 180 and supplies power necessary for the operation of each component.

The various embodiments described herein may be implemented as software, hardware, or a combination thereof in a storage medium that may be read by a computer or a similar device thereof. In the case of hardware, the embodiments may be implemented using at least one of ASICs ("Application Specific Integrated Circuits"), DSPs ("Digital Signal Processors"), DSPDs ("Digital Signal Processing Devices"), PLDs ("Programmable Logic Devices"), FPGAs ("Field Programmable Gate Arrays"), processors, controllers, micro-controllers, microprocessors, and electrical units for performing functions. Some of the embodiments may be implemented by the controller 180.

In the case of software, some embodiments related to procedures or functions may be implemented together with a separate software module that performs at least one function or operation. A software code may be implemented by a software application written in a programming language. Further, the software code may be stored in the memory 160 and executed by the controller 180.

Figure 2:
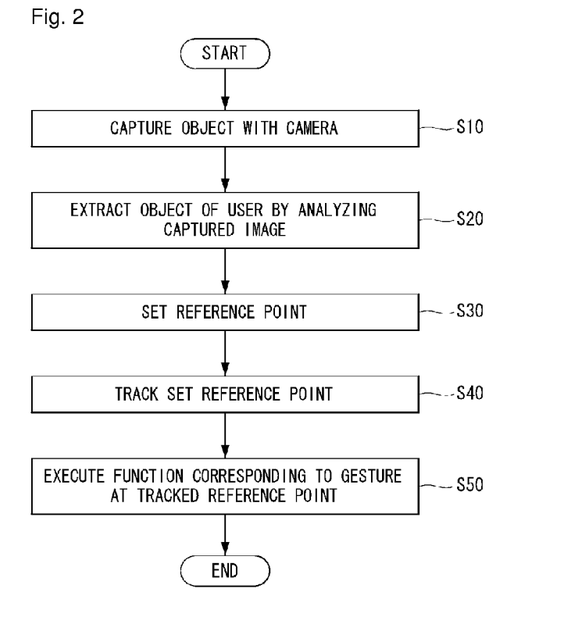
FIGS. 2 through 4 are flowcharts illustrating the operation of the display device of FIG. 1.
Figure 3:
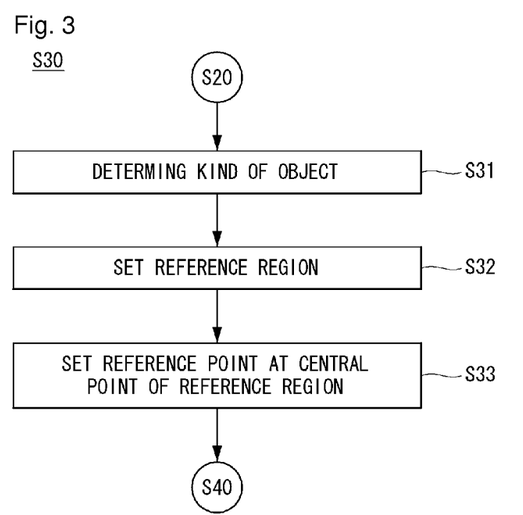
Figure 4:
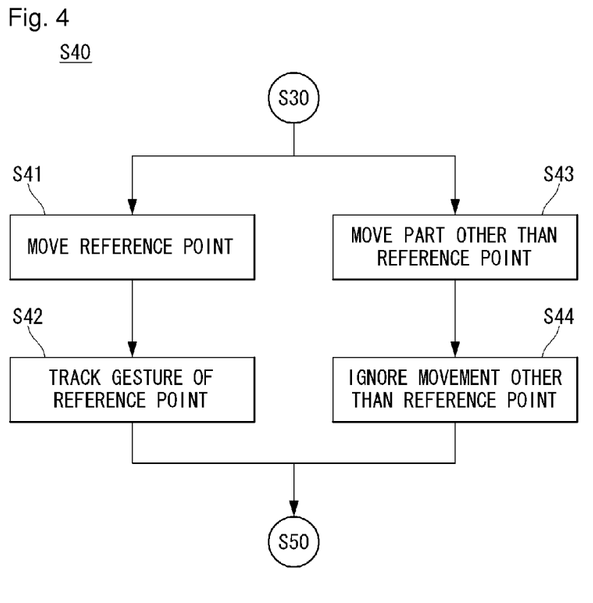
Figure 5:
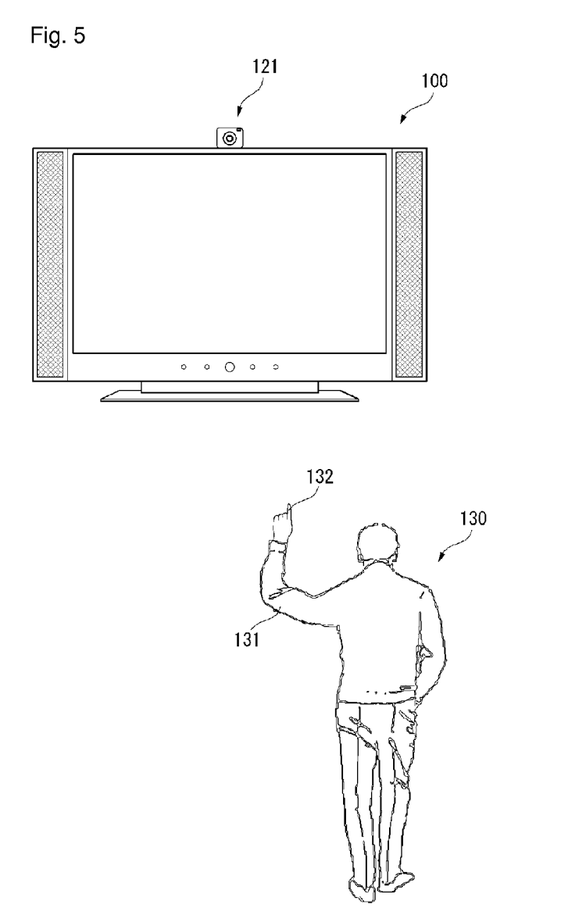
FIG. 5 is a view illustrating a process in which the display device of FIG. 1 acquires a gesture of a user.

FIGS. 2 through 4 are flowcharts showing the operation of the display device of FIG. 1, and FIG. 5 is a view illustrating the process in which the display device of FIG. 1 acquires a gesture of a user.

As shown in the drawings, the controller 180 (see FIG. 1) in the display device 100, according to an embodiment of the present invention, may allow the camera 121 (see FIG. 1) to capture an object (S10).

The object may refer to a user 130 or the like, included in an image captured by the camera 121 of the display device 100. The camera 121 may capture an image of the front side of the display device 100. Thus, the camera 121 may capture a variety of objects, such as a user 130, positioned in front of the display device 100. This means that the object may be any one of the variety of objects included in an image captured by the camera 121.

An object of the user 130 may be extracted from the captured image by analyzing the captured image (S20).

Objects captured by the camera may include the user 130. That is, the user 130 of the display device 100 may be included in the captured objects. This means that the user 130 positioned in front of the display device 100 may be captured by the camera 121.

The extracted object of the user 130 may include a gesture of the user 130. That is, a specific motion made by the user 130 in front of the camera 121 may be captured. The controller 180 may extract the specific motion made by the user 130, namely, a gesture, from the image including a variety of objects.

The term "gesture" may be used, distinguished form the term "posture". The gesture may be a series of postures taken in a specific moment. In describing the present invention, the term "gesture" comprehends the term "posture".

The gesture of the user 130 may be a specific motion made by using the arm 131 of the user 131, or a specific pose made by the hand 132 of the user 131. The controller 180 may extract only the gesture of the user 130 from the captured image. The controller 180 may extract the gesture of the user 130 by recognizing the shape of a person in the captured image. For example, an object in an image may be recognized as a person when it includes the shapes of a head, a torso, arms and legs. Furthermore, the user s image may be extracted by using a method of recognizing a body part, extending from the torso while moving near the head, as an arm, and recognizing the end of the arm as a hand. The controller 180 may recognize a portion of the extracted image, showing a hand motion, as the gesture of the user 130.

After the gesture is extracted, a reference point may be set based on the extracted gesture (S30) and the set reference point is tracked (S40).

The reference point may be a target to be mainly tracked by the controller 180 for the recognition of a gesture. A specific point or a predetermined region may be determined to be the reference point. For example, the reference point may be the entire region of the user 130 s hand 132 or one central spot of the hand 132.

Hereinafter, the setting of the reference point (S30) will be described in more detail with reference to FIG. 3.

The setting of the reference point (S30) may include determining the kind of object (S31).

The object may be various body parts, such as the user s hand, arm, leg, torso or the like. The controller 180 may determine the kind of extracted object.

The determining of the kind of object may be performed while the object is extracted (S20). That is, the kind of object may be determined first in a captured image, and the object is then extracted according to a result of the determination.

After the kind of object is determined, a reference region is set on the basis of the determined kind of object (S32).

The reference region may be a portion of the object that does not change in shape even when the user makes a gesture. For example, in the case of the hand, the shape of a finger may vary according to a gesture made by the user. That is, the area of a captured finger image may be variously changed according to a gesture of the user such as if one or all of the fingers are extended. However, the area of the palm is not substantially changed in shape. That is, the area of the palm may be substantially the same regardless of whether the fingers are flexed or extended. Therefore, the palm may be set to be a reference region according to an embodiment of the present invention.

After the reference region is set, the central point of the reference region may be set to be a reference point (S33).

The reference point may refer to a spot serving as a reference for extracting the trace of the object. The controller 180 may allow a cursor or the like displayed on the display unit 151 to move while matching with the trace of the moving reference point. For example, if the central spot of the palm is set to be the reference point, the cursor may move according to the trace where the palm is moving.

The controller 180 may set the central point of the reference region to be the reference point. As described above, the reference region may be a region which is not substantially changed in area regardless of gestures. Since the area thereof does not change, the controller 180 may rapidly and accurately determine the central spot of the reference region. Furthermore, once the reference point is set, the controller 180 may track the spot without easily missing it.

After the reference point is set, the set reference point may be tracked (S40).

Hereinafter, the tracking of the reference point (S40) will be described in more detail with reference to FIG. 4.

When the set reference point moves (S41), a gesture of the reference point may be tracked (S42). Meanwhile, in the case where parts other than the reference point move (S43), the movement of the parts other than the reference point may be ignored (S44).

As the specific reference point has been set, the controller 180 may find out the user 130's intention by tracking the reference point, until a specific event making the acquired control thereupon to be lost occurs. For example, the camera 121 may be allowed to capture only a specific spot on the palm, which is the reference point, or the controller 180 may be allowed to analyze only an image regarding the reference point. In such a manner, the limited resources of the display device 100 can be effective used.

After the set reference point has been tracked, a function corresponding to the gesture of the tracked reference point may be executed (S50).

The user, having acquired control upon the display device 100, may make a gesture to thereby have a specific function executed upon the display device 100. For example, the user may change a broadcasting channel by making a gesture in a vertical direction or change a volume by making a gesture of drawing a circle. When a gesture corresponding to a specific function is input, the controller 180 may execute the specific function by tracking the reference point.

Figure 6:
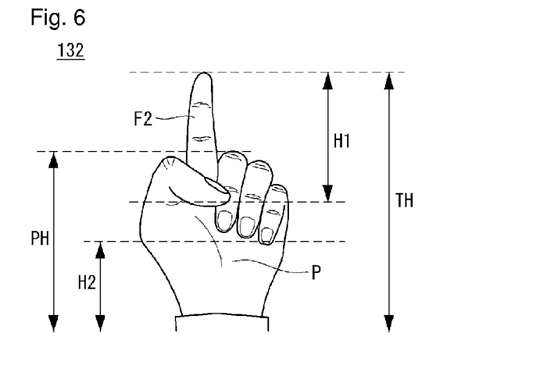
FIG. 6 is a view illustrating the location of a reference point set by the display device of FIG. 1.
Figure 7:
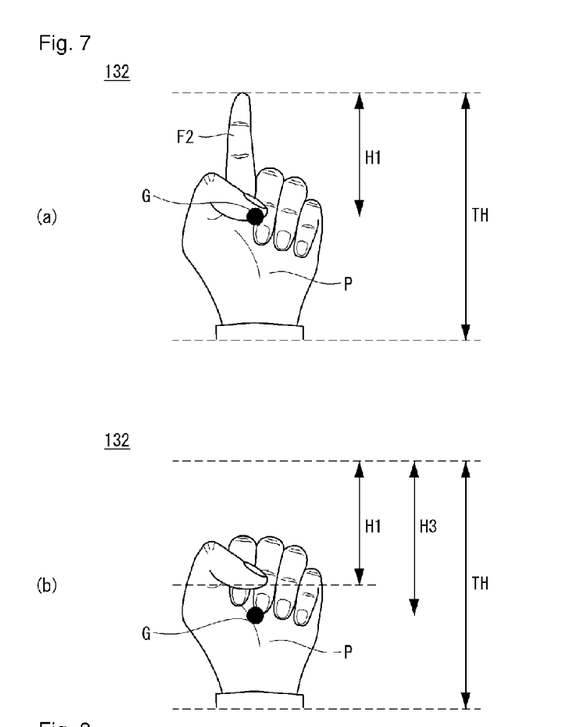

FIG. 6 is a view illustrating the location of a reference point set by the display device of FIG. 1.

As shown therein, the controller 180 of the display device 100, according to an embodiment of the present invention, may set a reference point at an appropriate location on a captured image.

The camera 121 (see FIG. 1) may capture the hand 132 of the user 130 (see FIG. 5). As described above, there may be various objects, but hereinafter, the user 130's hand 132 will be described as an object for ease of understanding.

The hand 132 of the user may create various gestures. Furthermore, there may be a variety of gestures allowing for the user to acquire control upon the display device 100. For example, the motion of unfolding the index finger F2 of the user may be a gesture to acquire control upon the display device 100.

After the user acquires control thereupon by making a predetermined gesture, the controller 180 may set a reference point at a specific spot on the object where the gesture has been made. The reference point may be set based on the area or shape of the object, namely, the hand 132.

A length from the tip of the index finger F2, the upper end of the hand 132 to the wrist, the lower end of the hand 132 may referred to as a first length TH. The length of the palm P, excluding the length of the index finger F2, may be referred to as a second length PH. The start and end points of the second length PH can be easily determined in that the object is the hand 132. That is, the controller 180 can recognize the shape thereof on the basis of the fact that the palm P of the hand 132 is relatively round in shape.

The controller 180, according to an embodiment of the present invention, may set the palm P to be a reference region in setting a reference point. That is, this means that the reference region may be set at the palm P, which is not easily changed in area and shape regardless of gestures made by fingers. When the palm P is set to be the reference region, the controller 180 may set the reference point at a second location H2 positioned in the middle of the second length PH.

There may be a case in which a reference point is set on the basis of the entirety of the hand 132, not just the palm P. That is, the reference point may be set at a first reference location H1 positioned in the middle of the first length TH. Prior to describing effects of setting the reference region at the palm P and accordingly setting the reference point, the case in which the reference point is set with reference to the entire area of the hand 132 will be described first.

FIGS. 7A through 10B are views illustrating the case where a reference point varies according to a gesture.

As shown in those drawings, if a reference point is set on the basis of the entire area of the hand 132, the location of the set reference point may be easily changed.

As shown in FIG. 7A, a reference point G may be set at the first reference location H1 positioned in the middle of the first length TH of the entire hand 132. That is, the reference point G may be set at the middle point of the entire length of the hand 132, which is measured while the index finger F2 is being extended.

As shown in FIG. 7B, when the index finger F2 is flexed, the reference point G may be changed. That is, when the entire length of the hand 132 is reduced as the index finger F2 is flexed, a third reference location H3 may become the new central spot of the hand 132. As the entire length of the hand 132 is reduced, the third reference location H3 is positioned below the first reference location H1. In this case, the reference point G may be different from that in the case where the index finger F2 is extended.

Figure 8:
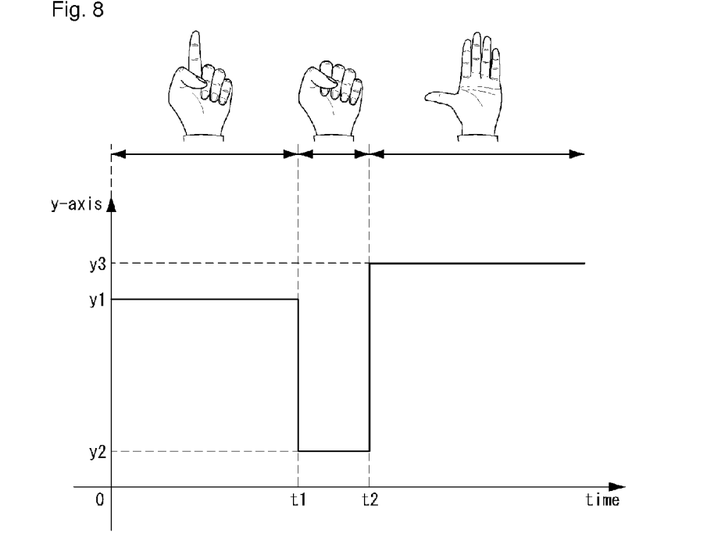

As shown in FIG. 8, if the reference point G is changed, the location of a cursor on the display unit 151, matched to the reference point G, may also be changed. The x-axis of FIG. 8 represents time, and the y-axis thereof represents y coordinates on the display unit 151.

The user may have the index finger F2 extended until time point t1. In the case where the user extends the index finger F2, the middle point of the entire length of the hand may be matched to y1 in FIG. 8.

From time point t1 to time point t2, the user may flex the index finger F2. When the index finger F2 is flexed, the entire length of the hand is reduced. Thus, the middle point of the hand is moved to a lower spot of the hand than before, thereby moving the reference point to a lower side. The cursor matched to the reference point may be moved from y1 to y2 accordingly. This has the same effect as when the user moves the hand 132 downwardly.

At time point t2, the user may extend the thumb and all of the fingers. In general, the middle finger is longer than the index finger. In the case where the five digits of the hand 132 are all extended, the entire length of the hand 132 is longer than that in the case where only the index finger is extended. Thus, the central spot of the hand 132 is elevated to the highest possible level, and the reference point may also be moved to the highest possible level accordingly. Thus, the cursor matched to the reference point may be moved from y2 to y3.

Figure 9:
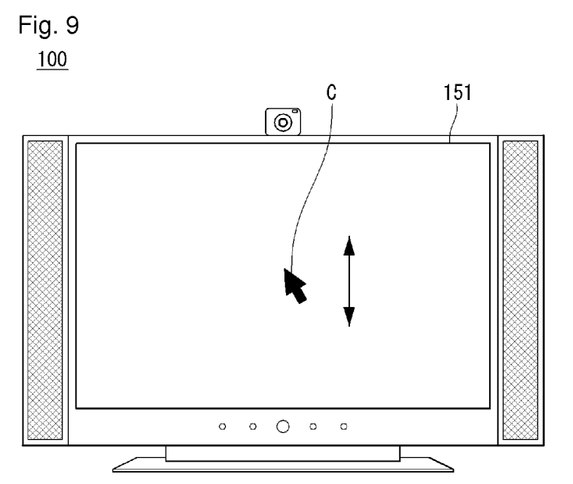
Figure 10:
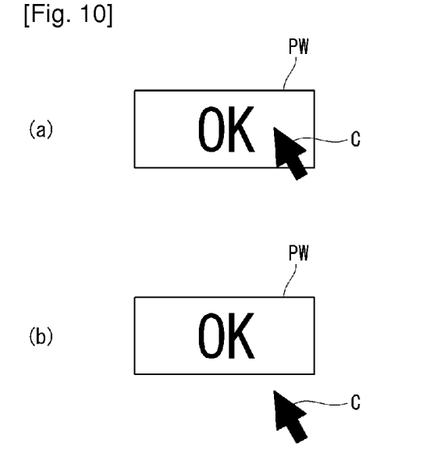
Figure 11:
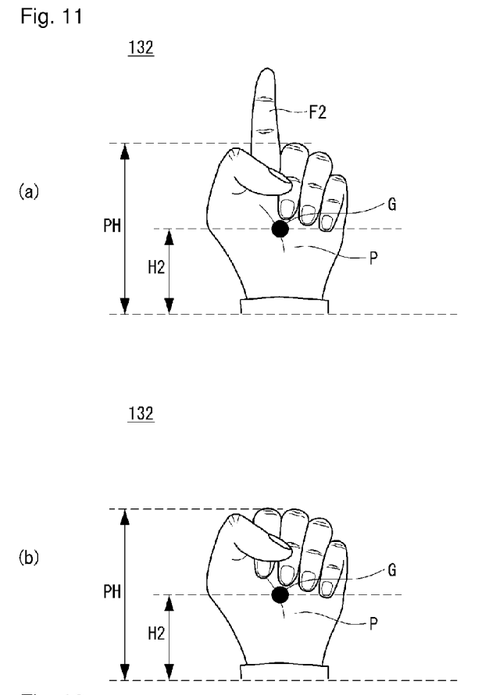

As shown in FIG. 9, a cursor C may be displayed on the display unit 151. The cursor C may be moved corresponding to a gesture of a user. For example, when the user, having acquired control upon the display device 100, moves the hand 132, the cursor C may move accordingly. When the reference point is set on the basis of the length of the entire hand 132, the cursor C may move up and down even if the user does not move the hand 132.

As shown in FIG. 10A, the user may move the hand 132 to locate the matching cursor C on a selection window PW.

As shown in FIG. 10B, the cursor C may be moved downwardly as the user flexes the finger without moving the hand 132. That is, the cursor C may be moved to the outside of the selection window PW. However, in the case where cursor C is moved according to one extended finger and a specific menu is selected by flexing the finger, inconvenice in use may occur as the cursor C is moved by a gesture of the finger.

FIGS. 11A through 13B are views illustrating the operation of the display device according to an embodiment of the present invention.

As shown in the drawings, the controller 180 of the display device, according to an embodiment of the present invention, may allow a reference point G to be fixed to a set location regardless of finger gestures.

As shown in FIG. 11A, a user may make a gesture of extending the index finger F2. The controller 180 may set a reference point G at a second location H2 corresponding to the middle of a second length PH, referring to the length of the palm P only. That is, the index finger F2 does not take into consideration in determining a length required to set the reference point G.

As shown in FIG. 11B, since the reference point G is set by using the palm P as a reference region, the reference point G may be fixed to the second location H2 even if the user flexes the thumb and all the fingers.

Figure 12:
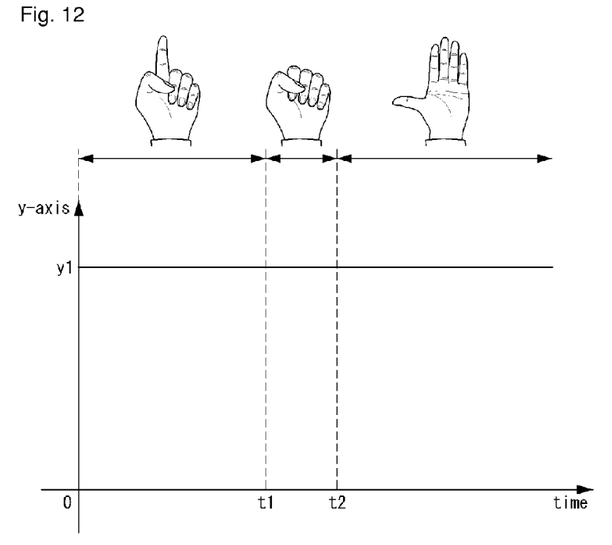
Figure 13:
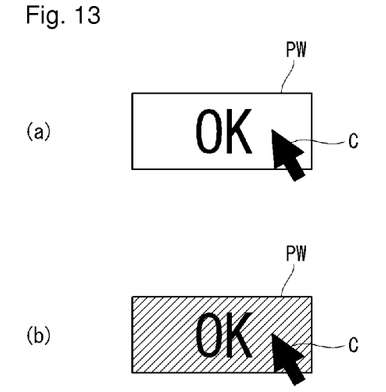

As shown in FIG. 12, the user may make different gestures at respective time points t1 and t2. That is, the user may have one finger extended until time point t1, then makes a fist until time point t2, and thereafter, extend the thumb and the four fingers. Even if the user makes various gestures as described above, the location on the display unit 151 corresponding to the reference point G may not be changed from y1 in the display device according to an embodiment of the present invention. In this manner, the cursor C is prevented from being moved by finger motions.

As shown in FIG. 13A, the cursor C may be positioned on the input window PW by a gesture of the user.

As shown in FIG. 13b, the cursor C may not be placed outside the input window PW even when the user moves his finger to select on the input window PW. Since the reference point G is not moved, a selection operation upon the input window PW may be facilitated. This means that a selection function upon the input window PW is being executed corresponding to a gesture of the finger, which is an object outside the palm, the reference region of the hand.

Figure 14:
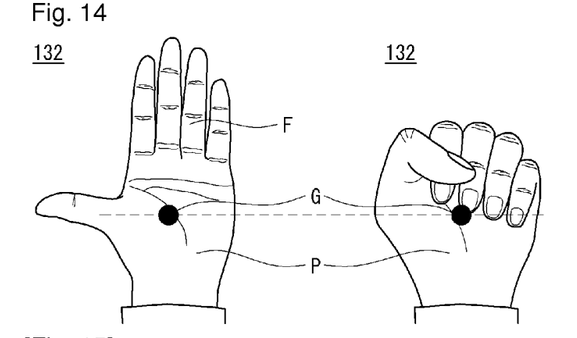
FIGS. 14 and 15 are views illustrating how a reference point is set according to an embodiment of the present invention.
Figure 15:
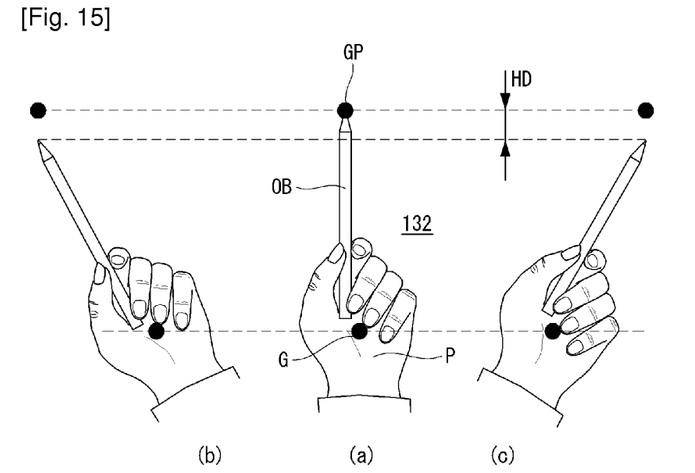

FIGS. 14 and 15 are views illustrating the setting of a reference point according to an embodiment of the present invention.

As shown in the drawings, the display device, according to an embodiment of the present invention, may allow for the setting of a reference point G at various locations.

As shown in FIG. 14, the controller 180 may cause the reference point G to be located at the same location regardless of whether the thumb and the fingers F are extended or flexed. That is, as only the palm P, excluding the fingers F, is set to be the reference region, the reference point G may be fixed regardless of gestures of the fingers F.

As shown in FIG. 15, the controller 180 may set the reference point G on the basis of the palm P. The reference point G may be maintained at the same location by setting the reference point G on the basis of the palm region P even when the hand 132 rotates, rather than vertically moves.

The controller 180 may set a reference point GP at the end of an object OB. In this case, the object OB may vary in height according to the inclination of the hand 132. Thus, the controller 180 may set the highest spot among reference points GP to be a reference; otherwise, the controller 180 may ignore the movement of the reference. For example, in the case where a pencil, an object OB, is inclined to make a gesture for selecting a specific menu, the height difference caused by the inclination of the pencil may not be reflected to the movement of the cursor C. That is, when a gesture corresponding to a preset specific function and the movement of the reference point GP are input simultaneously, the controller 180 executes only the function corresponding to the gesture without moving the cursor C.

While the present invention has been shown and described in connection with the embodiments, it will be apparent to those skilled in the art that modifications and variations can be made without departing from the spirit and scope of the invention as defined by the appended claims.

The invention claimed is:

1. A display device comprising:
   a display unit;
   a camera acquiring an image including a gesture made by a user; and
   a controller configured to:
   extract an object associated with the gesture from the image acquired by the camera;
   set a reference point, fixed regardless of a change in a shape of the object according to the gesture, at a specific spot in the extracted object; and
   control the display unit to display a cursor on a location matched to the reference point and execute a function corresponding to a gesture on a matched location,
   wherein, when the controller recognizes the gesture corresponding to a selection of a preset function of the display device, the controller does not reflect a motion value of the reference point on a movement of the cursor on the display unit matched to the reference point.

2. The display device of claim 1, wherein the controller sets the reference point on the basis of a reference region in which the extracted object is not substantially changed in shape.

3. The display device of claim 2, wherein the controller sets the reference point at a central portion of the reference region.

4. The display device of claim 2, wherein the extracted object is a hand of the user, and the reference region is a palm of the hand, wherein the controller sets the reference point in the palm.

5. The display device of claim 4, wherein the controller displays a cursor on a location on a display unit matched to the reference point, and a function corresponding to the gesture made by a finger of the hand is executed on the matched location.

6. The display device of claim 2, wherein the controller sets the reference region according to a kind of the extracted object.

7. A display device comprising:

a display unit;

a camera acquiring an image of an object; and a controller extracting the object from the image acquired by the camera and displaying an indicator corresponding to a movement of the object on the display unit, the controller changing a location of the indicator displayed on the display unit, corresponding to one spot in a reference region in which the extracted object is not substantially changed in shape, wherein, when the controller recognizes a gesture corresponding to a selection of a preset function of the display device, the controller does not reflect a motion value of a reference point on a movement of a cursor on the display unit matched to the reference point, wherein the controller sets a central point of the reference region to be the reference point matched to the indicator, and wherein the controller executes a function of the display device corresponding to a gesture of the object positioned outside the reference region.

8. The display device of claim 7, wherein the object is a hand, and the reference region is a palm of the hand, wherein the controller sets the one spot in the palm.

9. A method of controlling a display device, the method comprising:

acquiring an image of a user;

extracting an object making a gesture from the acquired image;

setting a reference point, fixed regardless of a change in a shape of the object according to the gesture, at a specific spot in the extracted object; and displaying a cursor on a location matched to the reference point on a display unit and executing a function corresponding to a predetermined gesture on a matched location, wherein, when the controller recognizes the gesture corresponding to a selection of preset function of the display device, the controller does not reflect a motion value of the reference point on a movement of the cursor on the display unit matched to the reference point.

10. The method of claim 9, wherein, in the setting of the reference point, the reference point is set on the basis of a reference region in which the extracted object is not substantially changed in shape.

11. The method of claim 10, wherein, in the setting of the reference point, the reference point is set at a central point of the reference region.

12. The method of claim 10, wherein the extracted object is a hand of the user, and the reference region is a palm of the hand, wherein the reference point is set in the palm.

13. The method of claim 9, further comprising displaying a cursor a location of which is changed corresponding to the reference point.

14. The method of claim 9, wherein the setting of the reference point includes:

determining a kind of object;

setting a reference region according to the determined kind of object; and setting the reference point at a central point of the reference region.

\* \* \* \* \*